W. STRAIT.
SIDE HILL PLOWS.
No. 184,440.          Patented Nov. 14, 1876.
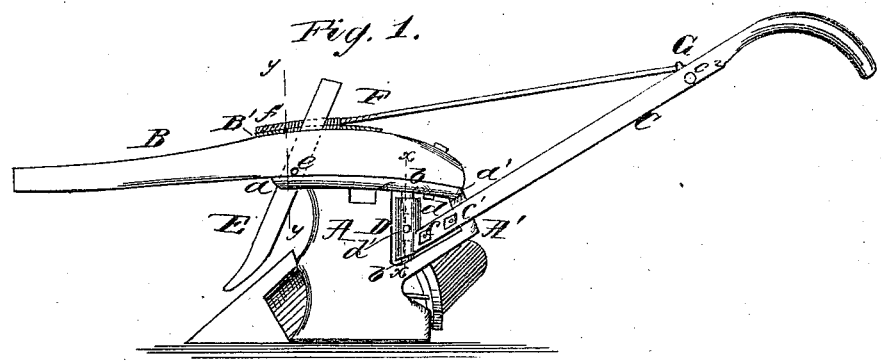
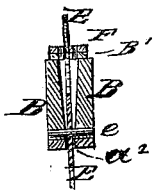
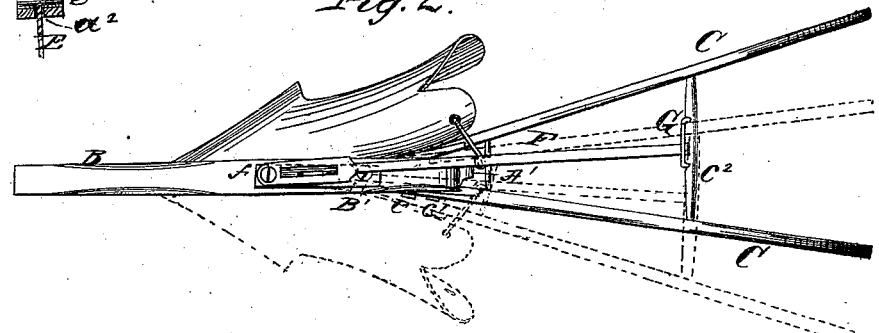
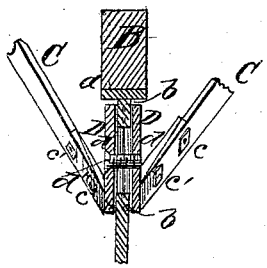
Witnesses.
Inventor
Wm. Strait.
per DeWitt C. Allen
Atty

UNITED STATES PATENT OFFICE.

WILLIAM STRAIT, OF ONEONTA, NEW YORK, ASSIGNOR TO C. L. STRAIT AND C. E. VAN DUSEN, OF SAME PLACE.

IMPROVEMENT IN SIDE-HILL PLOWS.

Specification forming part of Letters Patent No. 184,440, dated November 14, 1876; application filed September 11, 1876.

*To all whom it may concern:*

Be it known that I, WILLIAM STRAIT, of Oneonta, in the county of Otsego and State of New York, have invented certain new and useful Improvements in Side-Hill Plows, of which the following is a full, clear, and exact description of the same, reference being made to the accompanying drawing, forming a part of this specification, and in which—

Figure 1 is a side view; Fig. 2, a top or plan view; Fig. 3, a vertical section through the line $x$ $x$ of Fig. 1; and Fig. 4 is a vertical section through the line $y$ $y$.

This invention relates to improvements in side-hill plows, whereby the operator is enabled to walk directly in the furrow, and in either direction the furrow may be turned; and the invention consists in combining, with the standard of a side-hill plow, having a stationary beam, an adjustable handle, which can be turned to the right or left, as desired. It also consists in novel devices for pivoting the handles to the standard. It further consists in an automatically-adjustable colter, operated through the medium of the adjustable handles, whereby it is made to correspond with the position of the mold-board when changed from one side to the other of the beam. It finally consists in other minor details of construction, as hereinafter fully described, and pointed out in the claims.

A in the drawing represents the standard, and A' the rear extension thereof, having the beam-plate $a$ extending over the entire top surface thereof, so as to form a long and firm bearing-surface for the beam B, which is rigidly secured thereto by bolts and nuts in the usual manner. The rear extension A' of the standard is provided with an opening, within which the handles C are pivoted to lugs or pins $b$ $b$ cast on the upper side of the extension and under side of beam-plate, as clearly shown in Figs. 1 and 3.

The handles C are pivoted to the standard in the following novel manner: Each handle has secured to its lower end an angular metallic piece, D, constructed as shown in Fig. 3, the vertical semicircular portions $d$ thereof being adapted to fit loosely around the lugs or pins $b$ $b$ formed upon the standard, within the opening thereof, and which are secured together around said lugs or pins by a screw-bolt, $d'$, or any equivalent device, passing through them at or near their centers, as clearly shown in Fig. 3, whereby they are allowed to turn freely upon the lugs or pins, and which, in connection with the bolt and nuts $c$ $c'$, serve to fasten the lower portions of the handles together.

By pivoting the handles to the standard, within the opening thereof, it will be observed that the rear portion $a^1$ of the extension A' forms a stop, thereby limiting the movement of the handles to the right or left.

E is the colter or sward-cutter, fitted loosely upon the bolt $e$, within the vertical slot in the beam B, so as to hold it in its proper position vertically; and said slot, being made wider at the top than at the bottom, in a direction transverse to the beam, as shown in Fig. 4, allows the colter or cutter a lateral or vibrating movement, its center of motion being the pivot situated at the bottom of the slot in the beam. The colter or cutter passes up through the slotted bearing-plate B' and slotted shifting-lever F, by which it is operated. This lever F is pivoted at $f$ to the beam, and its free end extends backward and passes through a loop or guide, G, rigidly secured centrally to the upper cross-bar $c^2$ of the handle, as clearly shown in Fig. 2. This loop or guide G, while it prevents an upward or downward movement to the lever, permits a free movement from side to side as the handle is turned from right to left, or vice versa.

The operation of my improved plow may be described as follows: When the mold-board is placed at the right-hand side of the beam B the handles will also be turned to the right, in the position shown by plain lines in Fig. 2, by which the operator is enabled to walk directly in the furrow formed by the plow. By the above-described movement to the handles, the free end of the shifting-lever is caused to move from the right to the left of the loop, as clearly shown by the plain lines in Fig. 2, which moves the colter or cutter laterally, so as to bring its cutting-edge nearly beneath the left-hand side of the beam, or coincident with the line of cut of the upright share of the plow.

When the mold-board is changed to the left-hand side of the beam, the handles are also turned to the left, as shown in dotted lines in Fig. 2, so as to allow the operator to walk directly in the furrow; and at the same time the lever is caused to move from the left to the right of the loop, as shown in dotted lines in Fig. 2, which moves the cutter laterally, so as to bring its cutting-edge nearly beneath the right-hand side of the beam, so as to correspond with the line of cut as reversed.

The mold-board and handles are secured in their relative positions by a hook, secured centrally upon the cross-rod $h$ of the handles, with corresponding holes in the mold-board.

The front end of the beam-plate is provided with a slot, $a^2$, forming a holder for the cutter or colter to rest against, as shown in Fig. 4.

I do not desire to limit myself to the precise intermediate mechanism herein described for operating the colter or cutter through the medium of the adjustable handles, as any other suitable equivalent mechanism could be used without departing from the spirit of my invention.

I do not desire to confine myself to the use of the handles upon a standard having a wooden beam, as the adjustable or pivoted handles can be used with equal effect upon an iron-beam plow.

I am aware that laterally-adjustable colters have been automatically shifted from side to side by the turning of the mold-board; but I am not aware that they have ever been so shifted directly from the pivoted handles.

I claim as my invention—

1. The combination, with a plow having a stationary or fixed beam, of the adjustable or laterally and freely pivoted handles, whereby the operator is enabled to walk directly in the furrow, and in either direction the furrow may be turned, substantially as specified.

2. The devices for pivoting the handles to the standard, consisting of the lugs or pins $b\ b$ and metallic angular pieces D, having semicircular portions $d$ secured around the lugs or pins, in the manner substantially as described.

3. The combination of the pivoted handles with the standard A, having the opening in which the handles are pivoted, and the connecting-bar $a^1$, arranged to form a stop to limit the movement of the handles, as described.

4. In a reversible plow, the combination, with a laterally-adjustable colter or cutter, and laterally swinging or adjustable handles, of the lever F or its equivalent, substantially as described, whereby said colter or cutter is adjusted laterally by the movement of the handles, substantially as and for the purpose specified.

5. The combination of the colter or cutter E, shifting-lever F, loop or guide G, and adjustable handles C, substantially as and for the purpose specified.

WILLIAM STRAIT.

Witnesses:
T. K. MOSHER,
A. WINKLE.